(12) United States Patent
Tang

(10) Patent No.: US 9,897,896 B2
(45) Date of Patent: Feb. 20, 2018

(54) PROTECTIVE CASE FOR ELECTRONIC CAMCORDERS FOR AIR, LAND AND UNDERWATER USE EMPLOYING DUAL LENS COVERS

(71) Applicant: Larry Tang, East Brunswick, NJ (US)

(72) Inventor: Larry Tang, East Brunswick, NJ (US)

( * ) Notice: Subject to any disclaimer, the term of this patent is extended or adjusted under 35 U.S.C. 154(b) by 0 days.

(21) Appl. No.: 15/202,613

(22) Filed: Jul. 6, 2016

(65) Prior Publication Data

US 2017/0010518 A1 Jan. 12, 2017

Related U.S. Application Data

(60) Provisional application No. 62/188,789, filed on Jul. 6, 2015.

(51) Int. Cl.
| | |
|---|---|
| *G03B 11/04* | (2006.01) |
| *A45C 13/00* | (2006.01) |
| *A45C 11/38* | (2006.01) |
| *A45C 11/22* | (2006.01) |
| *G03B 17/08* | (2006.01) |
| *H04N 5/225* | (2006.01) |

(52) U.S. Cl.
CPC ............ *G03B 11/043* (2013.01); *A45C 11/22* (2013.01); *A45C 11/38* (2013.01); *A45C 13/008* (2013.01); *G03B 17/08* (2013.01); *H04N 5/2252* (2013.01); *A45C 2200/10* (2013.01)

(58) Field of Classification Search
CPC .................................................... H04N 5/2252
See application file for complete search history.

(56) References Cited

U.S. PATENT DOCUMENTS

| | | | |
|---|---|---|---|
| 2014/0007312 A1* | 1/2014 | Wright ................... | A61F 9/064 2/8.2 |
| 2014/0274232 A1* | 9/2014 | Tages ................... | H04B 1/3888 455/575.8 |
| 2015/0241761 A1* | 8/2015 | Llewellyn .............. | G03B 17/56 396/448 |

* cited by examiner

*Primary Examiner* — Christopher K Peterson
(74) *Attorney, Agent, or Firm* — Charles I. Brodsky

(57) ABSTRACT

A protective case for electronic camera/camcorders for air, land and underwater use employing a discardable, dispensable second lens cover within a second surrounding lens cover frame in overlying protection of a first clear lens cover within a first surrounding lens cover frame incorporated within a front surface of the protective case.

8 Claims, 4 Drawing Sheets

FIG.1
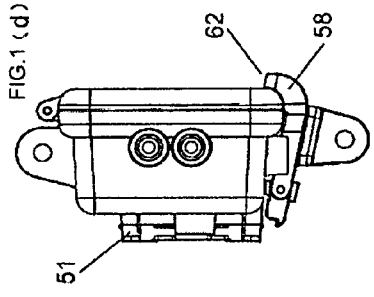
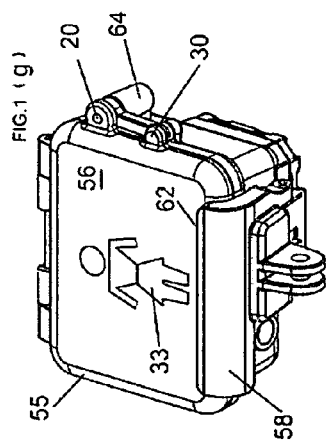
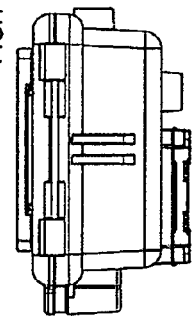
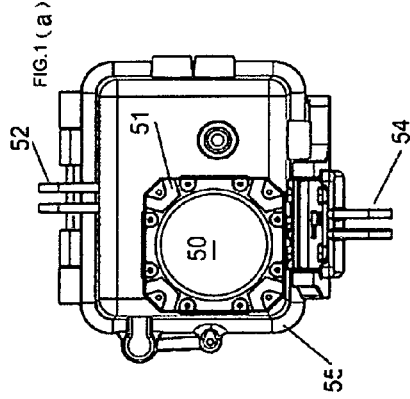
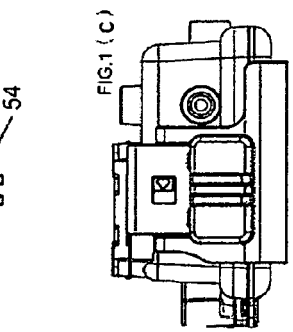
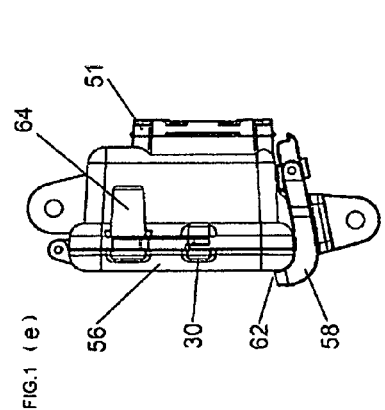
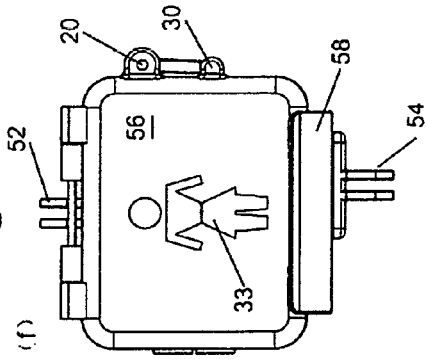

FIG.3
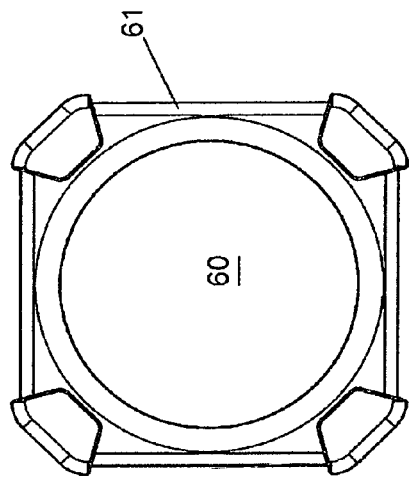
FIG.3 (a)
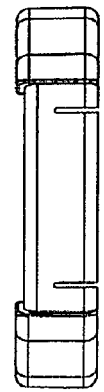
FIG.3 (c)
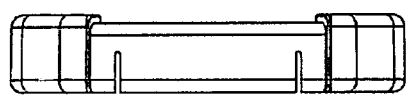
FIG.3 (d)
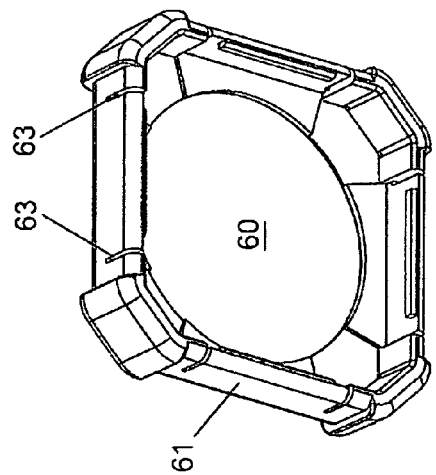
FIG.3 (b)

FIG.4
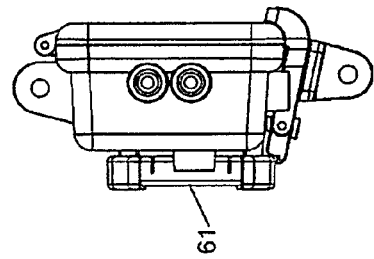
FIG.4 (a)
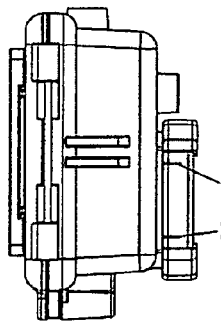
FIG.4 (b)
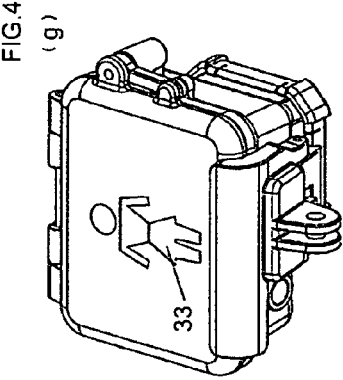
FIG.4 (c)
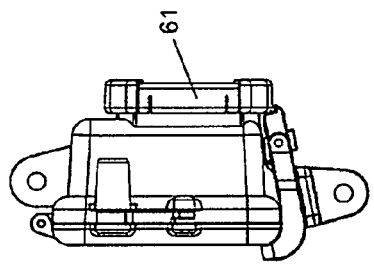
FIG.4 (d)
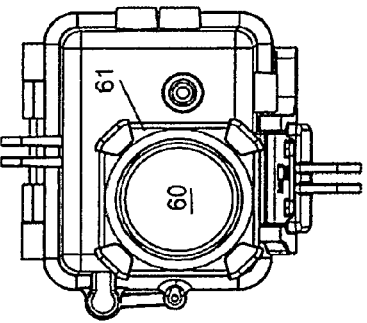
FIG.4 (e)
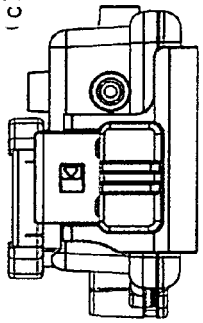
FIG.4 (f)
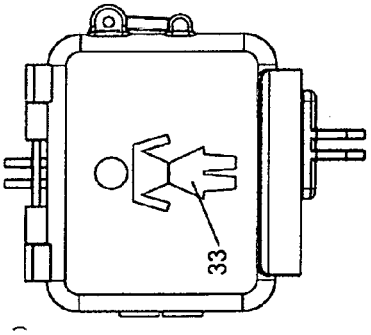
FIG.4 (g)

US 9,897,896 B2

PROTECTIVE CASE FOR ELECTRONIC CAMCORDERS FOR AIR, LAND AND UNDERWATER USE EMPLOYING DUAL LENS COVERS

CROSS-REFERENCE TO RELATED APPLICATIONS

A Provisional Patent Application covering the invention described herein was filed on Jul. 6, 2015, and assigned Ser. No. 62/188,789.

STATEMENT REGARDING FEDERALLY SPONSORED RESEARCH OR DEVELOPMENT

Research and development of this invention and Application have not been federally sponsored, and no rights are given under any Federal program.

REFERENCE TO A MICROFICHE APPENDIX

Not Applicable

BACKGROUND OF THE INVENTION

Field of the Invention

This invention relates to electric camcorders, in general, and to those employing protective cases for air, land and underwater use, in particular.

Description of the Related Art

As has been described, if people wanted footage of themselves engaged in physical activities, until fairly recently, they needed another person to hold and operate an electronic camera for them. Furthermore, the camera operator needed to be skilled in order to obtain compelling content. Additionally, capturing high-quality content often required expensive, fragile and cumbersome camera equipment that was not accessible to everyone. Accordingly, it was not often practical for people to document their experiences during their lives' most enjoyable moments.

In order to accommodate photography during such physical activities as skating, skiing, hiking, biking, mountain climbing and sky-diving, for example, camera manufacturers have recently come to develop, manufacture and market high-definition digital video electronic camera/camcorders, often used in these action video photographic instances. Compact, lightweight, rugged and simple to operate, camera/camcorders of this sort have been made available to capture still photos or video through a wide-angle lens, with accessories to mount to a helmet, to a bumper or to a windshield of a vehicle. Various wearable or mountable manners have also been developed to facilitate self-capture experiences different from those previously attainable with traditional cameras and smartphones.

Recognizing that the use of these camera/camcorders would also offer unique photographic perspectives in such activities as surfing, snorkeling, spear fishing, kayaking, white water rafting, and scuba-diving, protective cases claiming a waterproof capability have been proposed to enclose these video systems for use in such environmental activities—or even just for wet-weather photographing in general.

As will be appreciated, such digital video electronic camera/camcorders, whether designed for air and land use—and for underwater use in accordance with further developments—are not inexpensive. Costing several hundreds of dollars, and even more, their availability to wide sectors of the populous becomes increasingly limited as the sophistication of the digital systems become greater. But, as it has been recognized that shoes are rentable at bowling alleys, that skates are rentable at ice and roller rinks, that skis and boots are rentable at the slopes and that clubs are rentable at golf course pro shops, so too it is hoped that these protective waterproof cases and digital video electronic camera/camcorders will also become available for daily and weekly rentals—and not only for air and land use as in skating, skiing, hiking, biking, mountain climbing and sky-diving, but also in such wet-weather and underwater activities as surfing, snorkeling, spear fishing, kayaking, white water rafting, scuba diving and ski jumping.

OBJECTS OF THE INVENTION

Appreciating that the general rough nature of these activities might very well lead to possible damage of the electronic camera/camcorders, several of them have been manufactured for inclusion within protective cases. Whether the electronic camera/camcorders be within protective cases for photographing air, land, wet-weather or underwater activities, however, it is an object of the invention to allow for their rental usages rather than sale, and in a manner lending to relatively simple repairs at a rental distribution center—and, more particularly, repairs of a most common type of damage in allowing them to be used once again within matters of a few minutes after their return at the drop off point.

SUMMARY OF THE INVENTION

As will become clear from the following description, the protective case of the invention, for electronic camera/camcorders for air, land and underwater use is effectively repairable through the employment of dual lens covers and frames, one emplaced stop the other, for ease of removal of a scratched or otherwise damaged top lens cover and frame, and replacement with another disposable top lens cover and frame. As will be appreciated by those skilled in the art, a greater detail of repair work would otherwise be required to remove and replace a single lens cover and frame that were installed as part of an initial protective case manufacture and placement for sale.

BRIEF DESCRIPTION OF THE DRAWINGS

These and other features of the invention will be more clearly understood from a consideration of the following description, taken in connection with the accompanying Drawings in which:

FIGS. 1a-1g are 7 views of a prior art protective case for a digital video electronic camera/camcorder with a simple lens cover and frame helpful in an understanding of the invention—with FIG. 1a being a front elevation view of the protective waterproof case, FIG. 1b being a top plan view thereof, FIG. 1c being a bottom plan view thereof, FIG. 1d being a right side elevation view, FIG. 1e being a left side elevation view, FIG. 1f being a rear elevation view, and FIG. 1g is a rear perspective view of the protective waterproof case;

FIGS. 2a-2d and 3a-3d are respectively illustrate various views of single and dual lens covers and lens cover frames helpful in the operation of the prior art protective waterproof case of FIG. 1; and FIGS. 4a-4g are 7 views respectively comparable to those of FIGS. 1a-1g but for a protective waterproof case with the dual lens covers and frames of FIGS. 3a-3d in position in accordance with the present invention.

DETAILED DESCRIPTION OF THE INVENTION

Figure 2:
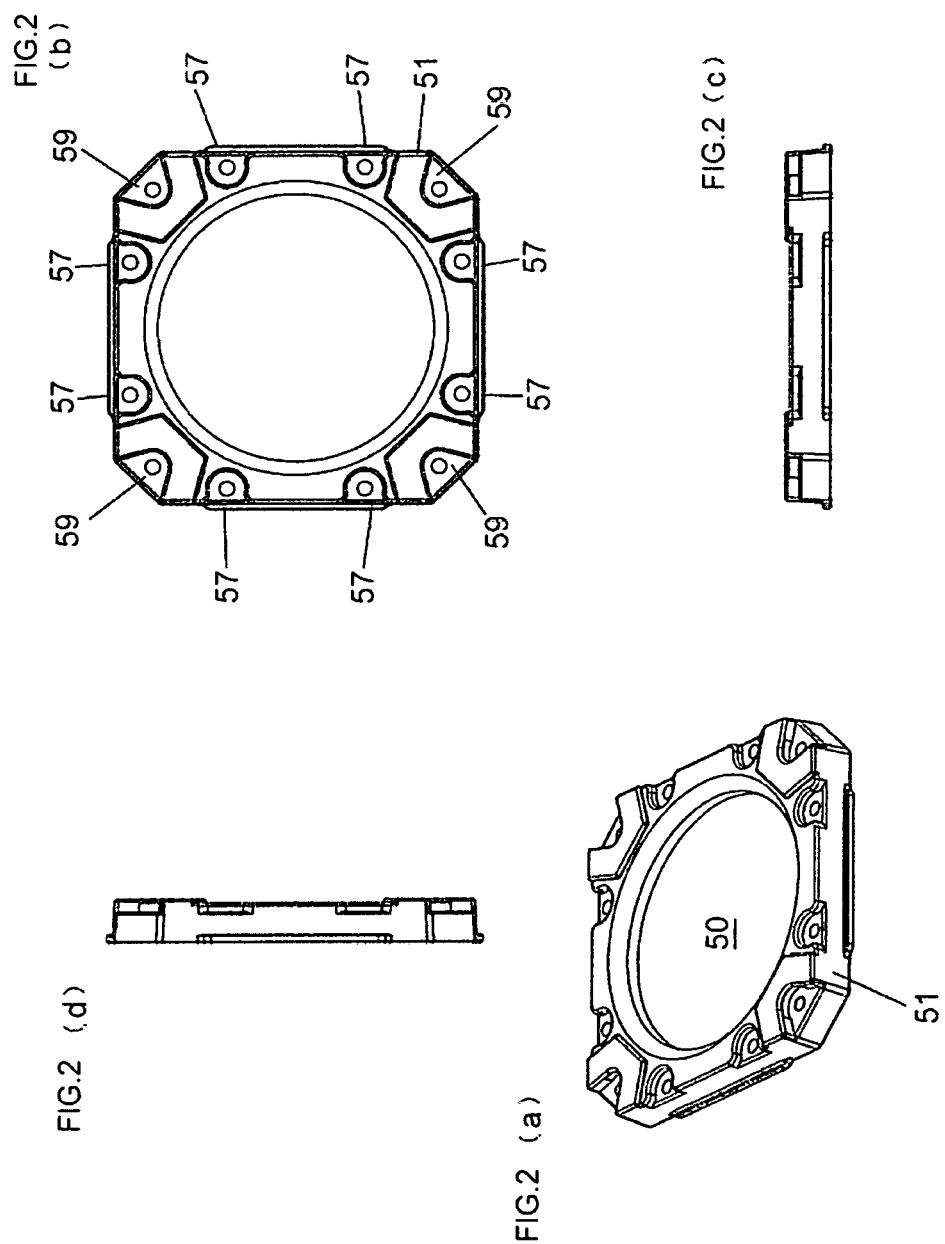

While the views of FIGS. 1a-1g together illustrate a prior art protective case for electronic camera/camcorders for air, land and underwater use, the teachings of the invention apply in like manner to those protective cases where only air and land usage is envisioned. (In accordance with a concurrently filed Application of mine (Non-Provisional Ser. No. 15/202,606, based on Provisional Ser. No. 62/188,779), the general difference between air and land use protective case and one intended additionally for underwater and wet weather usage is the inclusion in the latter [as represented in the views of FIGS. 1a-1g below] of an audio port to allow sound from an outside environment to reach the built in microphone incorporated in the digital video electronic camera/camcorder.) With this understanding, reference numerals 50 and 51 respectively identify a clear lens cover and a surrounding lens cover frame incorporated within a front surface of the prior art case 55, reference numerals 52 and 54 represent pillar receptors to couple to various mounts and accessories for the case and for the digital video electronic camera/camcorder enclosed within, and reference numeral 56 represents a transparent back cover. Reference numeral 58 represents a latch to lock and hold the back cover 56 closed, with its lip 62 bendable outward to allow the back cover 56 to be opened and closed. Reference numeral 64 represents a cup of an audio port for passing sound into the compartment which encloses the electronic camera/camcorder. In accordance with my above concurrently file Application Ser. No. 15/202,606, the audio port may be closed by inserting the plug of a sealing device into the cup for underwater use where sound input is not generally relevant in a recording, or opened by withdrawing the plug to allow desired sound pressure waves to penetrate for air and land use, in a second version described therein, the audio port cup itself may include a waterproof acoustic membrane within, and spanned across, the cup to allow the passage of sound to the electronic camera/camcorder microphone input (but not water) in the event the sealing device plug is forgotten to be inserted in advance of a water environment type usage.

The clear lens cover 50 and the surrounding lens cover frame 51 of the FIG. 1a-1g prior art case views are repeated in the front perspective view of FIG. 2a, in which FIG. 2b is a front elevation view, FIG. 2c is a top plan view and FIG. 2d is a left side view—a right side view being a mirror image. Taking the views together, the clear lens cover 50 is secured within the lens cover frame 51 on the front surface of the protective case by means of the fastener 57, with the lens cover frame 51 then being secured to the case by prong fasteners 59—as illustrated in FIG. 1a. As will be understood, any scratching or other damage caused to the clear lens cover 50 requiring its replacement would this necessitate the freeing of the 4 frame prong fasteners 59 and then the 8 lens cover fasteners 57 to remove and replace the clear lens cover 50 (or just the 4 frame prong fasteners 59 if the lens cover frame and clear lens cover were both to be discarded). This represents a limitation of these types of prior art electronic camera/camcorders.

In accordance with the present invention, on the other hand, a second clear lens cover 60 and a second surrounding lens cover frame 61 are employed, with the second clear lens cover 60 and lens cover frame 61 intended to be of a disposable material and/or of a lesser durability characteristic. Such second lens cover 60 and such second lens cover frame 61 are illustrated in the front elevation view of FIG. 3a, and with a plurality of clip or like fastener receptors 63 shown in the rear perspective view of FIG. 3b, the top plan view of FIG. 3c and the left side view of FIG. 3d—in which a right side view is of a mirror image.

To protect the more expensive clear lens cover 50 according to the invention, the second, disposable lens cover 60 and second lens cover frame 61 of FIGS. 3a-3d can then be clipped to or snapped over the first lens cover frame 51 and held in position, or incorporated as a slide that can be secured in position atop the clear lens cover 50 and lens cover frame 51. When damage to the cover-up second, disposable lens cover 60 follows, the second lens cover frame 61 merely has to be unclipped, unsnapped, or slid upwardly, and replaced with a different lens cover and lens cover frame in a matter of seconds, for the continued taking of stills or videos in the photographic environment of concern.

The comparable views of FIGS. 4a-4g illustrate both sets of lens covers and lens cover frames in place on the protective case—with the logo 33 in FIGS. 1 and 4 just being representative of a display on the electronic camera/camcorder screen.

With the second set of Drawings, those of FIGS. 4a-4g, it will be apparent that the second lens cover 60 and second lens cover frame 61 are designed to be hand-forced to lock onto the first lens cover 50 and the first lens cover frame 51 in protecting the clear lens cover 50 against marring or scratching. After return of the protective case to the rental distribution station, a service person can just use a screwdriver, for example, to pry off the second lens cover frame and discard it with its dispensable lens cover 60 if necessary, and then replacing them if needed for a subsequent use. Also, as will be apparent, the same operation can be had even in a non-renter situation, where the owner of the protective case and the electronic camera/camcorder simply replaces the second lens cover 60 and second lens cover frame 61 whenever necessary, or wherever the electronic camera/camcorder is going to be used—both whether for air, land or underwater environment. And, in a rental situation, one or more of the overlying lens cover, lens cover frame combinations 60, 61 could even be included in an offering package, so that the user could, by himself or herself, accomplish the replacement of a damaged lens cover 60, without having to return to the distribution station to have the matter addressed.

While this aspect of the invention as to the protection of the clear lens cover 50 has been described in the context of a protective case for underwater usage of the digital video system as well as for air and land usage, it will be appreciated by those skilled in the art that the effectiveness of the dual lens cover and lens cover frame combination 60, 61 would apply equally as well to protective cases for electronic camera/camcorder use only in an air and/or land environment. In other words, the advantages offered by the dual arrangement of the invention would thus apply in all manufacture usages equally as well.

While what have been described are considered to be preferred embodiments of the present invention, it will be readily appreciated by those skilled in the art that modifications can be made without departing from the scope of the teachings herein. For at least such reason, therefore, resort should be had to the appended claims for a true understanding of the invention.

I claim:

1. In combination with a digital video electronic camera/camcorder enclosed within a protective case, the combination comprising:

a first clear lens cover fastened to a surrounding first lens cover frame;

a second clear lens cover fastened to a surrounding second lens rover frame;

first means for fastening said first lens cover frame to a front surface of said protective case; and second means for detachably securing said surrounding second lens cover frame atop said surrounding first lens cover frame and for removal therefrom;

wherein said first clear lens cover and said surrounding first lens cover frame are characterized by a first durability characteristic and wherein said second clear lens cover and said surrounding second lens cover frame are characterized by a second lesser durability characteristic.

2. The apparatus of claim 1 wherein said second clear lens cover and said surrounding second lens cover frame include a clip fastener to detachably secure over said first clear lens cover and said surrounding first lens cover frame.

3. The apparatus of claim 1 wherein said second clear lens cover and said surrounding second lens cover frame include a snap fastener to detachably secure over said first lens cover and said surrounding first lens cover frame.

4. The apparatus of claim 1 wherein said first clear lens cover and said surrounding first lens cover frame are incorporated within a front surface of a waterproof protective case having an audio input port open to admit sound to a built-in microphone of a digital video electronic camera/camcorder enclosed within said protective case, together with means on said case for closing and sealing said audio input port for using the camera/camcorder enclosed therein under water or in wet weather/wet water activity environment.

5. The combination of claim 1 wherein said first means includes a plurality of prong fasteners.

6. The combination of claim 1 wherein said second means includes a plurality of detachable clip fasteners.

7. The combination of claim 1 wherein said second means includes a plurality of detachable snap fasteners.

8. The apparatus of claim 1 wherein said second clear lens cover and said surrounding second lens cover frame are characterized by a second lesser durability characteristic of a disposable material.

* * * * *